(12) United States Patent
Besier et al.

(10) Patent No.: US 6,776,634 B2
(45) Date of Patent: Aug. 17, 2004

(54) STEERING COLUMN SWITCH

(75) Inventors: Holger Besier, Oestrich-Winkel (DE); Thomas Hulbert, Eich (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/258,041

(22) PCT Filed: Apr. 12, 2001

(86) PCT No.: PCT/DE01/01478
§ 371 (c)(1),
(2), (4) Date: Jan. 15, 2003

(87) PCT Pub. No.: WO01/81119
PCT Pub. Date: Nov. 1, 2001

(65) Prior Publication Data
US 2004/0102070 A1 May 27, 2004

(30) Foreign Application Priority Data
Apr. 20, 2000 (DE) .......................... 100 19 795

(51) Int. Cl.$^7$ ................................ H01R 3/00
(52) U.S. Cl. ..................... 439/164; 439/488
(58) Field of Search ............. 439/164, 15, 488

(56) References Cited

U.S. PATENT DOCUMENTS

| | | | | |
|---|---|---|---|---|
| 5,601,437 A | * | 2/1997 | Harvey et al. ............. | 439/15 |
| 5,611,704 A | * | 3/1997 | Kamizono et al. .......... | 439/164 |
| 5,971,782 A | * | 10/1999 | Masuda ..................... | 439/164 |
| 6,271,515 B1 | * | 8/2001 | Matsumoto ................. | 250/239 |
| 6,410,909 B1 | * | 6/2002 | Rudolph et al. ....... | 250/231.13 |
| 6,468,096 B1 | * | 10/2002 | Nagatsuka ................. | 439/164 |
| 6,501,034 B2 | * | 12/2002 | Sugata ..................... | 200/61.54 |
| 6,541,962 B1 | * | 4/2003 | Borgmann et al. ..... | 324/207.17 |

FOREIGN PATENT DOCUMENTS

| | | |
|---|---|---|
| DE | 4427883 | 12/1995 |
| DE | 4436172 | 4/1996 |
| DE | 19649906 | 6/1998 |
| DE | 19755094 | 6/1999 |
| EP | 861753 | 9/1998 |
| EP | 913319 | 5/1999 |
| FR | 2753575 | 3/1998 |

* cited by examiner

Primary Examiner—Gary Paumen
(74) Attorney, Agent, or Firm—David P. Wood

(57) ABSTRACT

A steering column switch is provided with an electrical connecting device mounted in a housing that is affixed to the steering column jacket between the steering wheel and the steering column, said connecting device comprising a flexible, electrical conductor wound in the form of a spiral, which is inserted in an upper part of the housing and covered by a lid affixed to the steering wheel, wherein the conductor is coupled to the side of the steering wheel by means of a connecting unit and to a central printed circuit board that is connected to the electric system of the vehicle. A rotor of a steering angle sensor is assigned to the connecting device inside the housing, the stator on the housing side of said sensor contacting the printed circuit board.

10 Claims, 2 Drawing Sheets

STEERING COLUMN SWITCH

TECHNICAL FIELD

The invention generally relates to electrical switches and more particularly relates to a steering column switch with an electrical connecting device between the steering wheel and the steering column.

BACKGROUND OF THE INVENTION

DE 44 36 172 A1 discloses an electrical connecting device, in particular, for an airbag restraint accommodated in the hub of the steering wheel. This device contains a stationary housing part and a housing part that can be turned relative to the stationary housing part over a limited angular range, where the housing parts respectively carry a terminal unit and surround a spirally wound, flexible conductor, the ends of which are connected to the terminal units. The connecting device assigned to the hub of the steering wheel comprises a device for displaying the angular position of the housing parts relative to one another. The electrical coupling to the on-board network of the vehicle is realized by way of suitable wire harnesses, so that the installation is associated with relatively high cost, since the connecting device, as well as the required steering column switches, must be electrically connected to the on-board network. In addition, the hub of the steering wheel must be relatively large in order to accommodate the connecting device. The different wire harnesses of the connecting device and the steering column switches also require a relatively large amount of space within the steering column jacket.

Different devices for determining the amount of relative rotation between two elements are known. Here, one element usually consists of a stationary stator in the form of a housing or a holding arrangement, into which a second element that may be mounted on the steering column of the vehicle and that serves as the rotor is rotatably inserted.

In order precisely to determine the angle of rotation, it is common practice to utilize shaft encoders with analog or digital steering angle sensors. Digital steering angle sensors consist, in principle, of an encoded device and a sensor that scans the code, where the encoded device and sensor turn relative to each other. In incremental sensors, the encoded device consists of a disk or wheel with the same type of markings uniformly distributed over the circumference, the said markings are detected by the sensor and signaled by the delivery of corresponding pulses. Successive pulses are counted as a function of the direction of rotation in order to determine the resulting angle of rotation from the accumulated sum. However, it is necessary to define a reference position in order to determine the actual position. This reference position is usually defined in the form of a separate reference or zero marking that can be detected by the sensor. In absolute sensors, the coding is location-dependent, such that an individual signal that directly and unequivocally indicates the given position can be generated for each angular position. However, identical angular positions within successive complete revolutions cannot be geometrically differentiated. This is the reason additional measures must be taken, given the circumstances.

DE 196 49 906 A1 discloses an angular rotation sensor that consists of a sensor housing composed of a housing base part, an upper housing part and a lower housing part. A rotatable sensor shaft with a rotor disk that is arranged on the sensor shaft without rotational play and that carries sliding contacts and with a stator disk that is fixed on the sensor housing without rotational play and that contains several sliding contacts is arranged in the sensor housing. In addition, an electric line extends into the sensor housing, where said line is used to connect the angular rotation sensor to the on-board network of the vehicle. The sensor shaft is realized in the form of a hollow shaft and is provided with interior teeth in one of its two end regions such that it can be coupled to the steering system.

DE 197 55 094 A1 also describes a steering column switch with a unit consisting of an electrical connecting device and a steering angle sensor. The connecting device is arranged in a housing section that forms a cover for the stator of the steering angle sensor mounted on a printed-circuit board, where the printed-circuit board is realized in the form of a base that seals the cover. The interior of the steering column switch is located underneath the printed-circuit board.

DE 44 27 883 C1 discloses an electrically and/or optically functioning device with a holding device. The holding device is fixed on a steering column jacket and forms an integral component with the housing that belongs to an individual switch. A steering column lining is arranged on the holding device. The holding device carries a connecting device that is realized in the form of a spiral cable cassette and a steering angle sensor that is connected to a printed-circuit board. The individual functional components of the device described above are joined by means of fastening elements to form a manageable unit. The connecting device is attached on the side of a housing arrangement of the steering angle sensor assigned to the steering wheel, and the stationary housing part of the connecting device is screwed together with the holding device. The rotatable housing part of the connecting device engages in a circumferential groove in the housing arrangement of the steering angle sensor with a region that is realized in the form of a diaphragm and serves as the rotor.

EP 0 913 319 A2 discloses a steering angle sensor unit with an electrical connecting device that contains a spirally wound conductor and a steering angle sensor, where the steering angle sensor is integrated into the connecting device and the steering angle sensor unit is arranged between the steering wheel and the steering column switch to form a unit. The connecting device contains a cable holder for the conductor which is closed on its underside with a lower housing part. An upper rotor and a lower rotor are inserted into a cylindrical clearance of the cable holder. Thus, the steering angle sensor The invention is based on the objective of developing a steering column switch of the initially described type which is compact and combines a series of functions, wherein the steering column switch can also easily be installed due to the small number of individual components.

According to the invention, this objective is realized in that the conductor is coupled to a central printed-circuit board that is connected to the on-board network and directly contacted by the stator, where the rotor is realized in the form of a toothed wheel, where the stator comprises an intermediate wheel that is rotationally seated in a stator housing and meshes with the toothed wheel, and where a sensor that is realized in the form of a toothed wheel detects the revolutions of the intermediate wheel.

Consequently, no additional components are required for determining a change in the angular position of the steering column. Moreover, the rotor is fixed to the connecting device that is mounted on the steering wheel so that in any case a separate mounting on the steering column is eliminated. The electrical connection to the on-board network is also realized without additional components, e.g., wire harnesses, since the printed-circuit board of the steering column switch, which also fulfills other functions, is used to realize this connection.

According to an advantageous embodiment of the invention, the rotor is mounted on the cover and the stator is mounted on the upper housing part. The cover that is realized in the form of a rotatable component that spans the conductor of the connecting device undergoes the changes that occur in the angle of rotation synchronously with the steering wheel and thus the steering column. Thus, the rotor changes its position to the same extent as the steering column such that exact measurement values relative to the change in the angle of rotation are acquired.

For mounting purposes, the cover preferably contains a flange on the side of the steering wheel, wherein a coaxial projection for holding the terminal unit of the connecting device and for fixing the rotor is integrally formed on said flange. The flange spans the conductor and essentially lies in one plane with the upper side of the housing part. The terminal unit is used to form the relatively simple electrical connection between the steering wheel and the on-board network. The projection that protrudes from the flange of the cover passes through the free space in the center of the spirally wound conductor, as well as through the surface of the upper housing part on which the conductor lies. Due to the arrangement of the projection in the upper housing part, a defined position relative to the steering column Thus, an additional function can be integrated into the steering column switch, where the steering angle sensor and the steering column switch form a single structural unit that can be quite easily mounted on a steering column jacket of a motor vehicle. Consequently, no additional components are required for determining a change in the angular position of the steering column. Moreover, the rotor is fixed to the connecting device that is mounted on the steering wheel so that in any case a separate mounting on the steering column is eliminated. The electrical connection to the on-board network is also realized without additional components, e.g., wire harnesses, since the printed-circuit board of the steering column switch, which also fulfills other functions, is used to realize this connection. The change in the angle of rotation can be advantageously monitored and detected without contact if the stator is realized in the form of a sensor that detects the revolutions of the toothed wheel. Such a sensor is not subject to mechanical wear and is of small size. Consequently, the sensor occupies only little space once it is fixed on the upper housing part. In addition, relatively exact measurement data also to be additionally evaluated can be acquired with this sensor. The toothed wheel can be manufactured quite easily and provides the option of detecting a change in the angle of rotation in the form of a change in the position of the teeth, for example, by means of reflected light.

According to an additional refinement of the invention, the rotor is realized in the form of a toothed wheel, the hub of which overlaps the projection of the cover. The toothed wheel can be manufactured quite easily and provides the option of detecting a change in the angle of rotation in the form of a change in the position of the teeth, for example, by means of reflected light or a counting mechanism.

For mounting purposes, the cover preferably contains a flange on the side of the steering wheel, where a coaxial projection for holding the terminal unit of the connecting device and for fixing the rotor is integrally formed on said flange. The flange the conductor and essentially lies in a single plane with the upper side of the housing part. The terminal unit is used to form the relatively simple electrical connection between the steering wheel and the on-board network. The projection that protrudes from the flange of the cover passes through the free space in the center of the spirally wound conductor, as well as through the surface of the upper housing part on which the conductor lies. Due to the arrangement of the projection in the upper housing part, a defined position relative to the steering column is specified which the rotor also assumes.

According to an additional refinement of the invention, the hub of the toothed wheel overlaps the projection of the cover. The projection of the cover is preferably provided with several snap-fit arms that are uniformly distributed over the circumference and engage in corresponding grooves in the hub of the toothed wheel, which ensures the rotationally rigid arrangement of the toothed wheel on the projection and a simple installation of these components.

In order to achieve tolerance compensation and to detect even the slightest changes in the angle of rotation, the intermediate wheel has a smaller circumference than the toothed wheel and is supported on a displaceable, spring-loaded axis. The elastic axis ensures tolerance compensation here because the toothed wheel and the respective toothed wheel sensor have a fixed center of rotation that is represented by the steering column and by an axis on the stator side, respectively. The spring-loaded, displaceable axis is provided for the intermediate wheel because the distance between the steering column and the axis of the toothed wheel sensor varies due to tolerances and an interference-free meshing of the teeth of the toothed wheel and the teeth of the toothed wheel sensor still must be ensured. The intermediate wheel consequently is flexibly supported and assumes a position that corresponds to the respective distance between the steering column and the axis of the toothed wheel sensor.

The stator housing is fixed on guide ridges of the upper housing part by means of snap-fit elements in order to allow the installation of the stator housing without tools. The guide ridges that are realized integrally with the upper housing part not only serve for mounting the stator housing but also for its positioning.

The projection of the cover is preferably provided with several snap-fit aims that are uniformly distributed over the circumference and engage in corresponding grooves in the hub of the toothed wheel, which ensures the rotationally rigid arrangement of the toothed wheel on the projection and a simple installation of these components.

The change in the angle of rotation can be advantageously monitored and detected without contact if the stator is realized in the form of a sensor that detects the revolutions of the toothed wheel. Such a sensor is not subject to mechanical wear and is of small size. Consequently, the sensor occupies only little space once it is fixed on the upper ho using part. In addition, relatively exact measurement data to be evaluated can be obtained with this sensor.

According to an alternative refinement of the invention, the rotor comprises a coded perforated disk, as well as a revolution counter, where the stator comprises several photodetectors assigned to the rotor. The perforated disk, the pattern of which is detected by a photodetector, is used to detect a broad range of changes in the angle of rotation, i.e., between slight changes and changes of one full revolution of the steering wheel or 360°. The revolution counter is provided for detecting full revolutions of the steering wheel, where the perforated disk intercepts the assigned photodetector after each full revolution, and where this photodetector outputs the corresponding signals to be evaluated.

It is preferred to arrange the perforated disk between the upper housing part and the revolution counter. This means that the perforated disk is located in the immediate vicinity of the guide for the projection of the cover which lies on the housing side and correspondingly fixed in position.

In order to provide a transmitter and a receiver for the photodetectors in the form of an integrated component that can be easily mounted, the photodetectors are realized in the form of forked photodetectors.

In order to realize a wireless electric coupling, the sensor of the stator is preferably connected to the on-board network by means of terminal contacts that contact the printed-circuit board.

The sensor preferably detects a reversal in the direction of rotation of the rotor based on a corresponding metrology, as well as the assignment of the reference marks.

According to another advantageous embodiment of the invention, the sensor transmits the acquired measurement data to the on-board computer for evaluation purposes via the printed-circuit board. Thus, the correspondingly processed measurement data can be directly retrieved by suitable devices via data lines.

The printed-circuit board is preferably used for electrically connecting several individual switches to the on-board network. Consequently, the printed-circuit board combines the electrical functions of the steering angle sensor, the connecting device and the individual switches, for example, windshield wiper/washer switch, blinker switch, headlight switch and/or ignition lock or other electronic safety devices for releasing an ignition lock where the printed-circuit board transmits the corresponding functions to the on-board network of the motor vehicle.

DETAILED DESCRIPTION OF THE PREFERRED EMBODIMENTS

Figure 1:
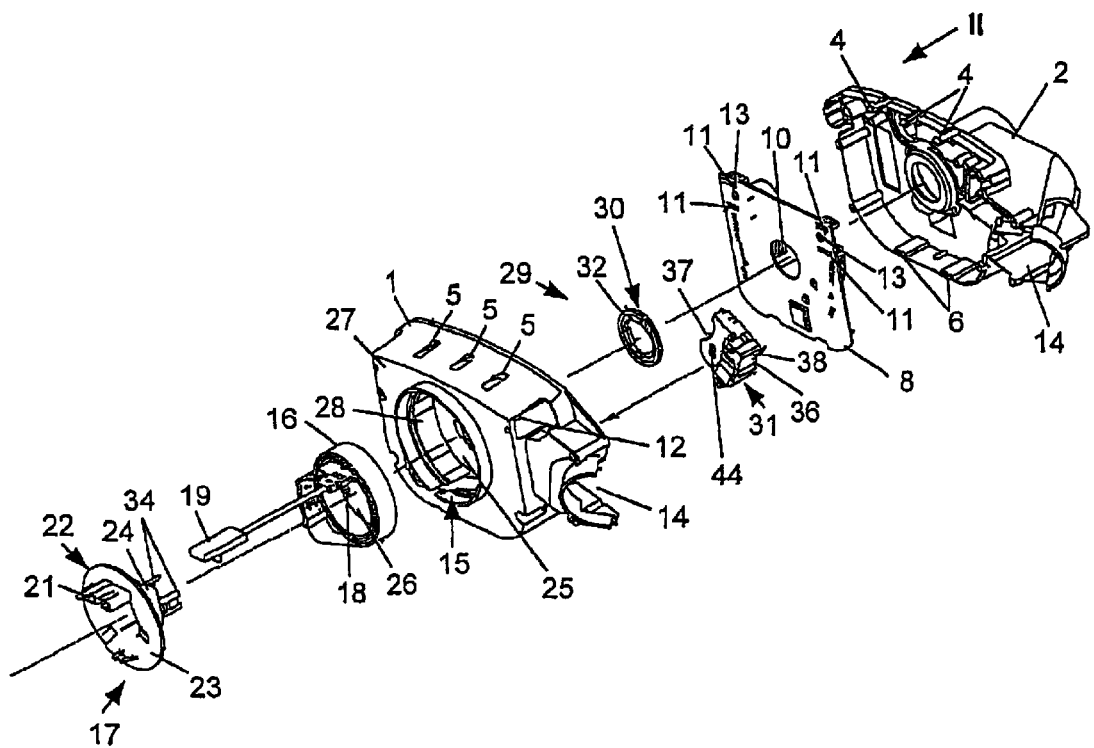
FIG. 1, an exploded view of the steering column switch according to the invention.
Figure 2:
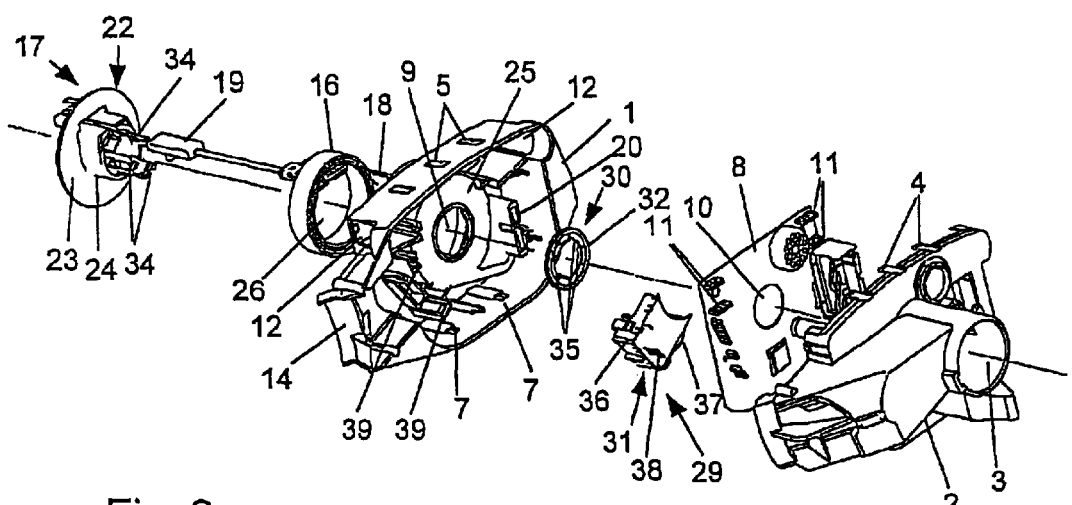
FIG. 2, an exploded view as seen from the direction of arrow II in FIG. 1.
Figure 3:
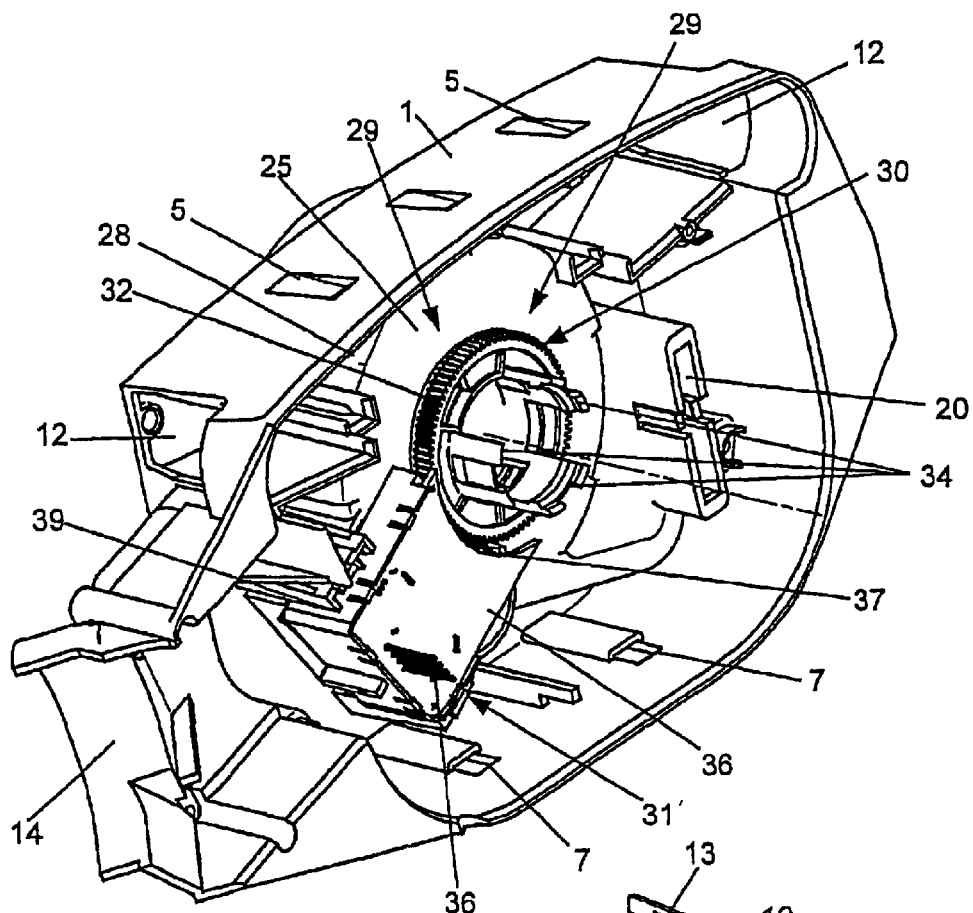
FIG. 3, a perspective representation as seen from the direction of arrow II in FIG. 1, and FIG. 4, an exploded view of another embodiment of the steering column switch according to the invention.
Figure 4:
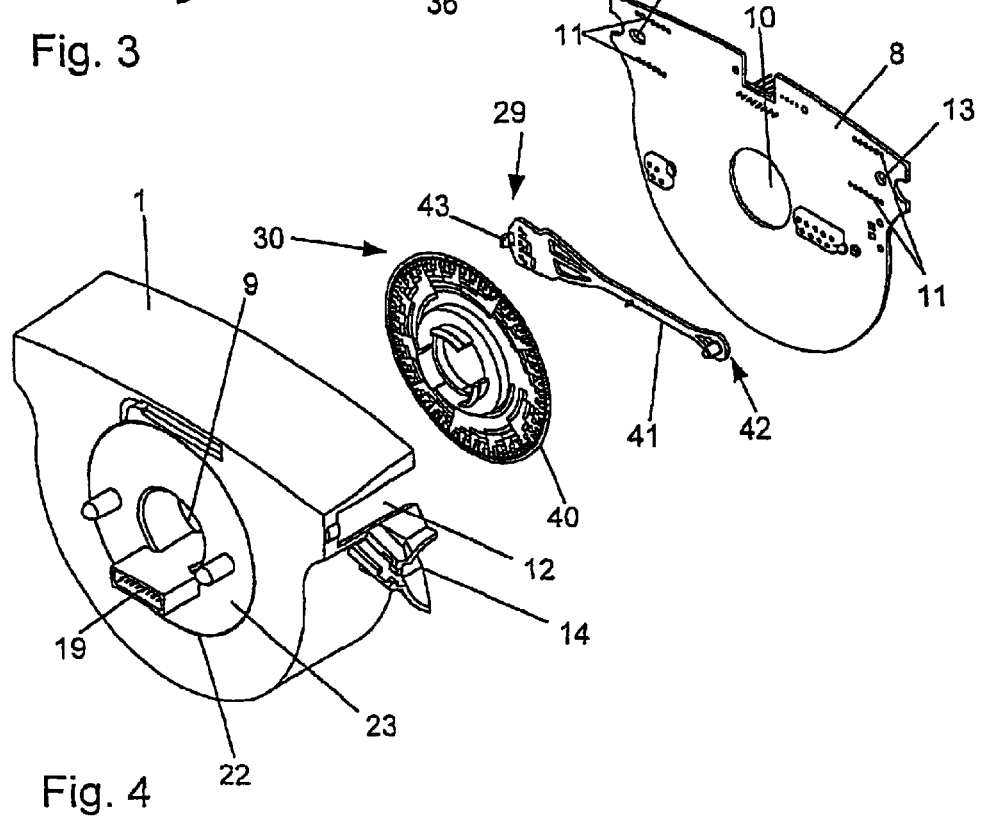

Now referring to FIG. 1, a steering column switch comprises a housing that is composed of an upper housing part 1 and a lower housing part 2, where a cylindrical clearance 3 for mounting the steering column switch on the steering column jacket (not shown) of a motor vehicle is formed in the lower housing part 2. The lower housing part 2 also contains peripheral snap-fit arms 4 that engage in corresponding openings 5 in the upper housing part 1 when the upper housing part 1 and the lower housing part 2 are joined. The lower housing part is also provided with centering openings 6, into which corresponding centering projections 7 of the upper housing part 1 are inserted. A printed-circuit board 8 that is electrically coupled to the on-board network and the on-board computer of the vehicle is also assigned to the lower housing part 2.

The printed-circuit board 8 contains a cylindrical opening 10 that is aligned with the clearance 3 in the lower housing part 2 and with a bore 9 in the upper housing part, 1, where this cylindrical opening serves for accommodating the steering column (not shown), the free end of which is connected to the steering wheel above the upper housing part 1. The printed-circuit board 8 is also provided with terminals 11 for individual switches (not shown), the operating elements of which extend through openings 12 in the upper housing part 1 and are fixed on the lower housing part 2 by means of screws that pass through through-holes 13 in the printed-circuit board. The printed-circuit board 8 is also connected to an ignition lock that is inserted into an opening 14 formed by the upper housing part 1 and the lower housing part The upper housing part 1 that overlaps the periphery of the lower housing part 2 contains a clearance 15 for accommodating an electrical conductor 16 of an electrical connecting device 17, where this connecting device couples the steering wheel to the on-board network via the printed-circuit board 8. The flexible conductor 16 is spirally wound with several revolutions and is provided with terminal units 18, 19 on its respective ends: one terminal unit 18 for insertion through a guide clearance 20 of the upper housing part 1 and coupling to the printed-circuit board 8; the other terminal unit 19, which is connected to the steering wheel, for insertion through an opening 21 in the cover 22. This cover contains a flange 23, onto which a coaxial projection 24 is integrally formed, on the side of the steering wheel such that it can be mounted thereon. The flange 23 of the cover 22 covers the conductor 16 that is supported on a base 25 formed by the upper housing part 1. The projection 24 is rotatably inserted into the base 25, where the projection 24 extends through the free space 26 formed by the conductor 16. The lateral limitation of the conductor 16 is thus formed by a wall 28 of the upper housing part 1, which extends from the upper side 27 to the base 25.

In order to detect a change in the angle of rotation of the steering wheel relative to the steering column switch, a steering angle sensor 29 is arranged between the connecting device 17 and the upper housing part 1 of the steering column switch, where said steering angle sensor essentially consists of a rotor 30 and a stator 31. The rotor 30 is realized in the form of a toothed wheel 32, the hub 33 of which is mounted without rotational play on the free end of the projection 24 of the cover 22 of the connecting device 17. For this purpose, the projection 24 contains several snap-fit arms 34 that are uniformly distributed over the circumference and engage in corresponding grooves 35 in the hub 33 of the toothed wheel 32, where these snap-fit arms hold the toothed wheel 32 in the housing formed by the upper housing part 1 and the lower housing part 2 in such a way that its end surfaces are essentially parallel to and separated from the base 25 of the upper housing part 1.

The stator 31 assigned to the rotor 30 essentially contains a stator housing 36 for accommodating an intermediate wheel 37 that meshes with the toothed wheel 32, as well as a sensor (not shown) that detects the revolutions of the intermediate wheel 37. The intermediate wheel 37 is of smaller circumference than the toothed wheel 32 and is supported on a displaceable, spring-loaded axis 44. When the steering wheel is turned, a relatively large number of teeth of the intermediate wheel 37 pass the sensor of the stator 31 due to the selected transmission ratio between the toothed wheel 32 that is rigidly arranged on the steering wheel and the intermediate wheel 37. The change in position of the intermediate wheel 37, which corresponds to the change in the angle of rotation of the steering wheel, is determined by means of reflections from the teeth. Alternatively, a measuring wheel (not shown) is provided which is coupled to the intermediate wheel 37, where the displaceable axis 44 of the intermediate wheel 37 compensates for the measurement tolerance between the steering column and the axis of the measuring wheel. In addition, the spring acting on the axis 44 creates uniform contact pressure from the intermediate wheel 37 onto the toothed wheel 32, as well as onto the measurement wheel.

Terminal contacts 38 for electrically connecting the sensor to the printed-circuit board 8 also protrude from the stator housing 36. The terminal contacts 38 also serve for realizing the data exchange between the sensor and an on-board computer via the printed-circuit board, where the on-board computer calculates the absolute angle of rotation or changes in the angle of rotation based on the measurement data of the sensor that can be output in the form of electrical signals and makes this data available to peripheral devices of the motor vehicle that are coupled to the on-board computer.

In order to lock the stator housing 36, the upper housing part 1 is provided with guide ridges 39, between which the stator housing 36 is held. The stator housing 36 is fixed by means of snap-fit elements (not shown).

In an alternative embodiment, the rotor 30 is realized in the form of a coded perforated disk 40 that is used to detect changes in the angle of rotation of the steering wheel up to one full revolution, i.e., 360 degrees, where a revolution counter 41 for detecting the full revolutions of the steering wheel is assigned to said perforated disk. The perforated disk 40 is connected without rotational play via the snap-fit arms 34 of the cover 22 of the connecting device 17 and consequently moves synchronously with the rotation of the steering wheel. One end 42 of revolution counter 41 protrudes over the circumference of the perforated disk 40, and in order to transmit rotational movements of the steering wheel, the counter is either also rigidly connected to the cover 22 or seated in the axis of the cover 22. In this case, a tab 43 of the revolution counter 41 engages with a spiral groove in the perforated disk 40 dr in a separate disk that is connected to the cover 22 without rotational play.

In order to scan the pattern or the coding of the perforated disk 40, a stator (not shown) that is mounted on the upper housing part 1 contains a forked photodetector that extends over approximately the entire radius of the perforated disk. The hole pattern of the perforated disk 40 represents corresponding angular positions of the steering wheel which are detected by the forked photodetector when the steering wheel is turned, where the photodetector transmit corresponding pulses to an on-board computer for evaluation purposes, via terminal contacts that are coupled to the printed-circuit board 8 as described above. The stator also contains a forked photodetector for detecting the passage of the revolution counter 41, where this forked photodetector also transmits its signals to the printed-circuit board 8 via terminal contacts and to the on-board computer coupled to the printed-circuit board 8.

LIST OF REFERENCE SYMBOLS

1 Upper housing part
2 Lower housing part
3 Clearance
4 Snap-fit arm
5 Snap-fit arm opening
6 Centering opening
7 Centering projection
8 Printed-circuit board
9 Hole
10 Opening
11 Terminal
12 Opening
13 Through-hole
14 Opening
15 Clearance
16 Conductor
17 Connecting device
18 Terminal unit
19 Terminal unit
20 Guide clearance
21 Opening
22 Cover
23 Flange
24 Projection
25 Base
26 Free space
27 Upper side
28 Wall
29 Steering angle sensor
30 Rotor
31 Stator
32 Toothed wheel
33 Hub
34 Snap-fit arm
35 Groove
36 Stator housing
37 Intermediate wheel
38 Terminal contact
39 Guide ridge
40 Perforated disk
41 Revolution counter
42 End
43 Tab
44 Axis

What is claimed is:

1. Steering column switch assembly, comprising: upper housing part and a lower housing part, a spirally wound, flexible electric conductor residing in the upper housing part, wherein the conductor is connected to a steering wheel by way of a terminal unit, a steering angle sensor rotor, and a steering angle sensor stator fixed to the upper housing part, wherein conductor is coupled to a central printed-circuit board that is connected to the on-board network and wherein, the central printed circuit board is in direct contact with the steering angle sensor stator, wherein the steering angle sensor rotor is in the form of a toothed wheel, wherein the steering angle sensor stator includes an intermediate wheel that is rotationally supported within a stator housing wherein the intermediate wheel meshes with the toothed wheel, and wherein a sensor detects the revolutions of the intermediate wheel.

2. Steering column switch according to claim 1, wherein the upper housing includes a cover with a mounting flange on the side of the steering wheel for mounting purposes, wherein said cover includes a coaxial projection for holding a terminal unit of a connecting device and for fixing the steering angle sensor rotor which is integrally formed on said mounting flange.

3. Steering column switch according to claim 2, wherein the toothed wheel includes a hub that extends over a projection of cover.

4. Steering column switch according to claim 3, wherein said cover includes several snap-fit arms that are distributed over a periphery of said cover, wherein said several snap-fit arms engage corresponding grooves in the hub of the toothed wheel.

5. Steering column switch according to claim 1, wherein the intermediate wheel is smaller in circumference than the toothed wheel and is supported on a displaceable, spring-loaded axis.

6. Steering column switch according to claim 5, wherein the steering angle sensor stator includes a stator housing fixed on guide ridges of the upper housing part by means of snap-fit elements.

7. Steering column switch according to claim 1, wherein the sensor is connected to the printed-circuit board by way of terminal contacts.

8. Steering column switch according to claim 1, wherein said sensor can detect a reversal in the direction of rotation of the steering angle sensor rotor.

9. Steering column switch according to claim 1, wherein the sensor transmits data relating to the revolutions of the intermediate wheel to an on-board computer for evaluation purposes said transmission in part, conducted by the printed-circuit board.

10. Steering column switch according to claim 1, wherein the printed-circuit board serves for electrically connecting several individual switches to the on-board network.

* * * * *